UNITED STATES PATENT OFFICE.

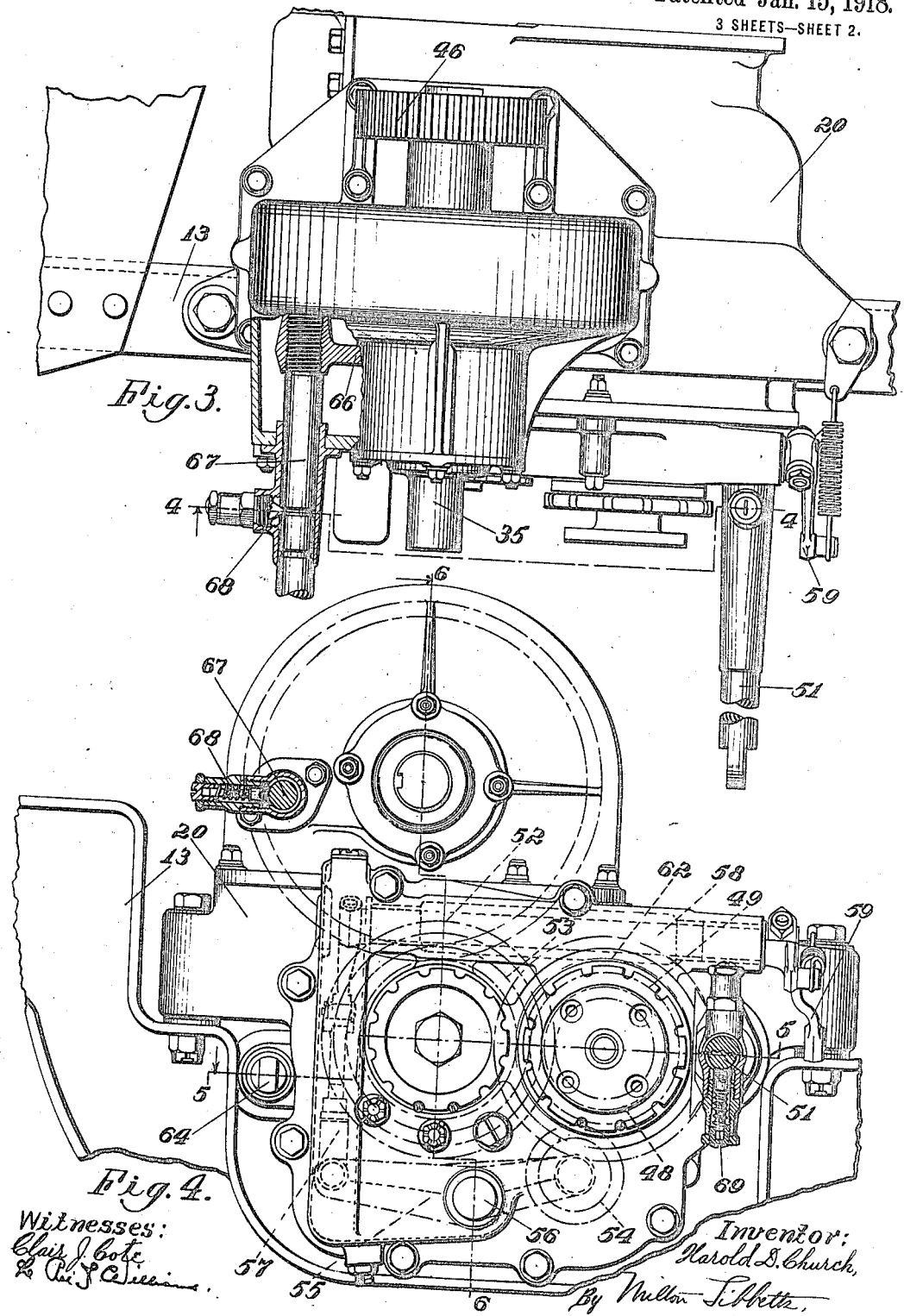

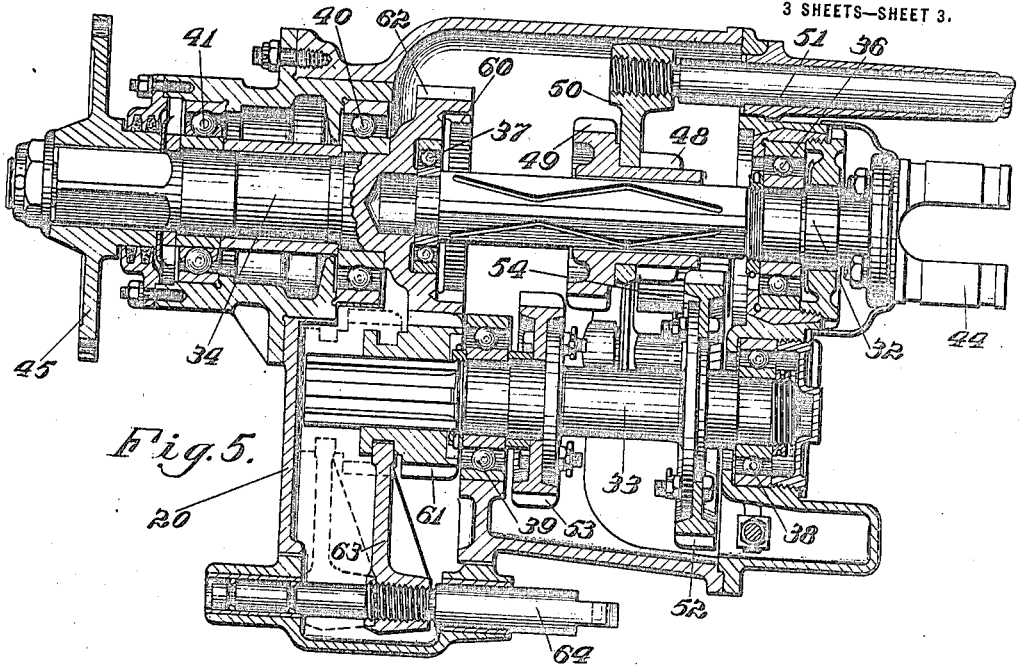

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,253,670.   Specification of Letters Patent.   Patented Jan. 15, 1918.

Application filed June 4, 1915. Serial No. 32,086.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles and particularly to gearing therefor.

In motor vehicles, particularly trucks or commercial vehicles, it is sometimes desirable to connect an auxiliary mechanism, such as a hoisting mechanism, to the motor or driving shaft thereof. The present invention has for its salient object to provide a gearing which will permit the operation of such an auxiliary mechanism at various speeds from the main driving shaft of the motor, either separately from the vehicle drive or simultaneously with it. One form of gearing for accomplishing this object is shown in the accompanying drawings, and it will be understood that this showing is illustrative only of the invention and that various modifications and departures in detail therefrom may be made without departing from the scope of the invention.

Other objects of the invention will also be evident from the following description taken in connection with the drawings, which form a part of this specification, and in which:—

Fig. 3 is a plan view of a gear casing embodying the invention, parts being broken away;

Fig. 4 is a front elevation of the gear casing shown in Fig. 3, parts being in section on the line 4—4 of Fig. 3;

Fig. 5 is a horizontal section substantially on the line 5—5 of Fig. 4; and

Fig. 6 is a vertical section substantially on the line 6—6 of Fig. 4.

Figure 1:
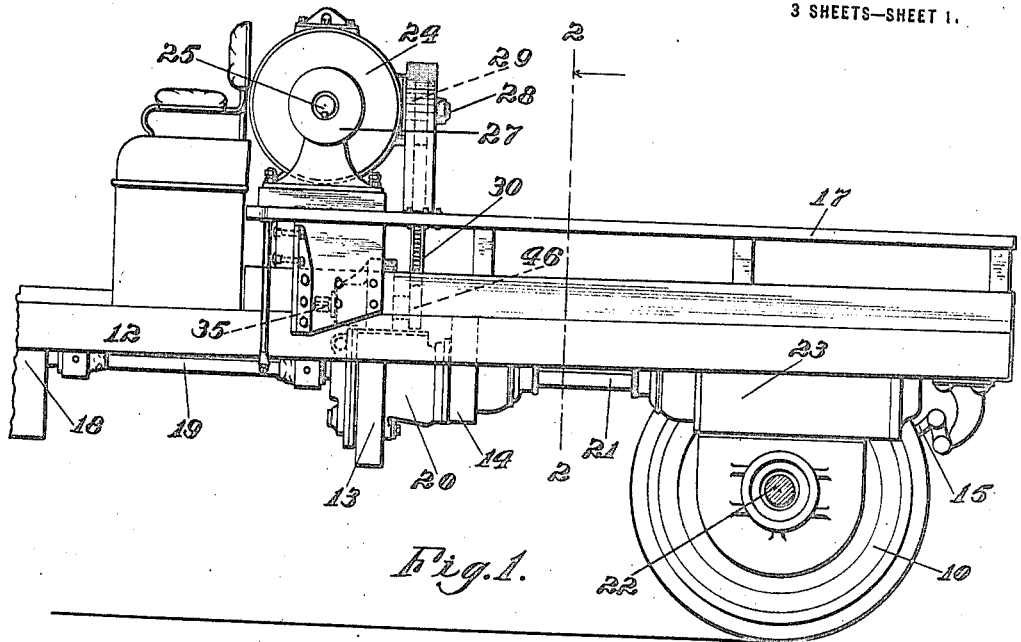
Figure 1 is a side elevation of part of a motor vehicle illustrating the application of this invention to use with a hoisting mechanism on a motor truck.
Figure 2:
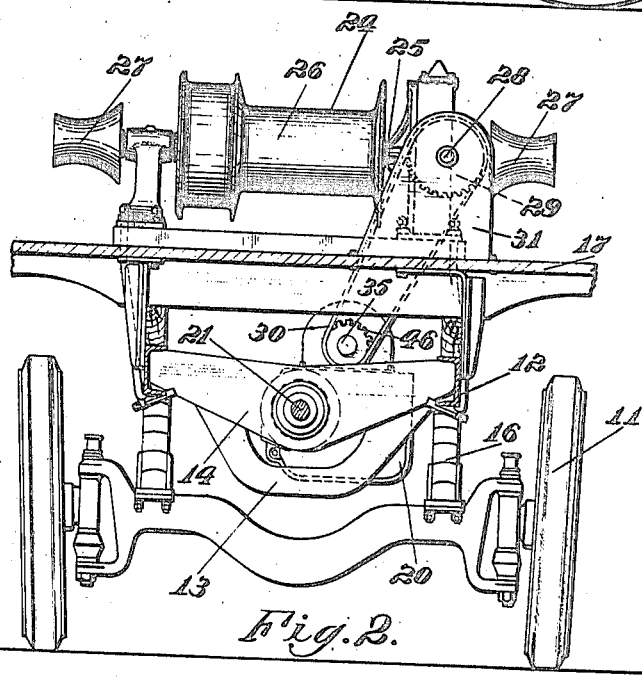
Fig. 2 is a transverse section on the line 2—2 of Fig. 1, the hoisting mechanism being in elevation.

Referring to the drawings, Figs. 1 and 2 illustrate a motor vehicle having main driving wheels 10, steering wheels 11, a frame comprising side members 12, and various cross members such as 13 and 14. The frame is supported on the wheels by suitable springs 15 and 16, and in turn supports a platform body 17. The rear end of a motor 18 is shown in Fig. 1 and it is connected through a driving shaft 19 to the gearing within a gear casing 20, which is shown as supported on the vehicle frame by the cross-members 13 and 14. A propeller shaft 21 transmits the power from the gearing within the gear box 20 to the rear axle 22 through suitable gearing contained within the housing 23.

An auxiliary mechanism, shown in this embodiment of the invention as a hoisting mechanism 24, is mounted on the platform body of the vehicle in a position approximately above the gear casing 20. This mechanism comprises a main shaft 25 upon which are the various hoisting drums 26 and 27, and it is driven through any suitable gearing from a shaft 28 having a gear or sprocket 29 driven by a chain 30. The chain and sprocket are housed within the casing 31.

Referring now more particularly to Figs. 3 to 6 inclusive, it will be seen that the gear casing 20 is suitably built up of various parts, and houses what may be termed the driving shaft 32, which is directly driven from the motor through the shaft 19 above referred to, a lay shaft 33 arranged parallel to the driving shaft 32, a driven shaft 34 which is shown as alined with the driving shaft 32, and a second driven shaft 35 arranged parallel to the other shafts. For convenience, these various shafts are referred to as driving, lay, and driven shafts respectively, but it will be understood that the drive may be reversed or other functions given the shafts without departing in any way from the invention.

The main driving shaft 32 is mounted in bearings 36 and 37, the former being in the casing wall and the latter being in the adjacent end of the alined driven shaft 34. Bearings 38 and 39 are provided in the casing for the lay shaft 33, bearings 40 and 41 in the casing support the driven shaft 34, and bearings 42 and 43, also in the casing, support the second driven shaft 35. Part of a universal joint 44 is shown on the front end of the driving shaft 32, and a flange 45 on the driven shaft 34 is provided for attaching a universal joint for connection of this driven shaft with the propeller shaft 21. It will be seen also that the second driven shaft 35 has both ends extending through the casing 20 and a gear or sprocket 46 is arranged on one of these projecting ends, and in Fig. 2 is shown driving the chain 30 which operates the hoisting mechanism. The other projecting end of the shaft 35 has a keyway 47 by which it is adapted to drive any other auxiliary mechanism desired.

Gears are mounted upon the various shafts above referred to and these are of such construction, arrangement and proportion, that two separate geared drives and a reverse gear drive are provided between the driving shaft 32 and the lay shaft 33, a direct driving connection is arranged between the driving shaft 32 and the driven shaft 34, a movable or releasable gear driving connection is arranged between the lay shaft 33 and the driven shaft 34, and a somewhat similar releasable or movable gear drive is arranged between one of the gears on said lay shaft 33 and the other driven shaft 35. Thus the gearing provides that either or both of the driven shafts 34 and 35 may be operated from the driving shaft at a plurality of forward and at a reverse speed.

Describing the gearing shown more in detail, it will be seen that the driving shaft 32 is squared in cross section throughout a portion of its length and a sliding gear element comprising gears 48 and 49 is arranged thereon and manually controlled or operated by a yoke 50 and rod 51. The gear 48 is adapted in one position to mesh with a larger gear 52 on the lay shaft 33, and the gear 49 is adapted to mesh with a gear 53 also secured to the lay shaft 33. Thus, with the gears 48 and 52 in mesh, it will be seen that the lay shaft 33 will be driven at a slower speed ratio from the driving shaft 32 than will be the case when the gears 49 and 53 are in mesh. There is also provided a reversing gear 54 having a wide face and adapted to be thrown into mesh with the gears 48 and 52 when they are in the neutral position shown in Fig. 5. Said reverse gear 54 is shown in full lines in Figs. 5 and 6, and in dotted lines in Fig. 4. Also in said Fig. 4 the bracket 55 which supports the reverse gear 54 is shown as pivotally supported at 56 and adapted to be manually operated through suitable link mechanism 57, rock shaft 58, and arm 59. The link and rock shaft are shown in broken lines in said Fig. 4, and the arm 59 is shown both in Figs. 3 and 4.

For the purpose of driving the shaft 34 directly from the driving shaft 32, internal teeth 60 are arranged on the forward end of the shaft 34 and the gear 49 is adapted to slide into these teeth and form a positive clutch connection between the two alined shafts.

The driven shaft 34 is also adapted to be driven from the lay shaft 33, gears 61 and 62 being provided for this purpose. One of these gears may be a sliding gear and in Figs. 5 and 6, the gear 61 is arranged to slide upon but turn with the lay shaft 33, and a yoke 63 and rod 64 are provided for the purpose of operating the gear. In said figures the gear 61 is shown in full lines as in mesh with the gear 62 so that it may transmit the power which it receives through its geared connection with the driving shaft 32 or so that it may be driven idly from the driven shaft 34 when the latter is directly connected to said driving shaft 32. In dotted lines, the gear 61 is shown in its inoperative position.

The driven shaft 35 is also adapted to be driven from the lay shaft 33 and this is done independently of any driving connection that may be had between the lay shaft and the driven shaft 34 or between the driving shaft 32 and said driven shaft 34. The ratio at which the driven shaft 35 is operated is also preferably lower than that at which the driven shaft 34 is operated. A portion of the shaft 35 is squared in cross section and is provided with a sliding gear 65 which is adapted to mesh with the gear 53 on the lay shaft 33. In Fig. 6, the gear 65 is shown as in inoperative position, but in dotted lines it is shown as in mesh with the said gear 53, whereby it may be operated at the various speeds at which the lay shaft 33 may be driven. The gear 65 is also adapted to be manually moved along its shaft as by the yoke 66 and rod 67. This, like the other gear shifting devices, is entirely independent and may be operated regardless of the position of any of the other devices. Spring pawls such as shown at 68 and 69 in Fig. 4 may be employed for yieldingly positioning the various sliding gears.

It will be understood from the above description that the two driven shafts 34 and 35 may be operated from the lay shaft 33 through the gears 61 and 53 respectively, or either of said driven shafts may be separately operated.

Having thus described my invention, what I claim and desire to secure by Letters Patent is:—

1. In gearing, in combination, a driving shaft, a shaft parallel thereto, sliding change speed gears connecting said shafts, and two driven shafts adapted to be separately or simultaneously driven from said parallel shaft.

2. In gearing, in combination, a driving shaft, a shaft parallel thereto, sliding change speed and reverse gears connecting said shafts, and two driven shafts adapted to be separately or simultaneously driven from said parallel shaft.

3. In gearing, in combination, a driving shaft, a shaft parallel thereto, sliding change speed gears connecting said shafts, two driven shafts, and gearing connecting the parallel shaft to the driven shafts for separate or simultaneous operation of said driven shafts.

4. In gearing, in combination, a driving shaft, a shaft parallel thereto, sliding change speed gears connecting said shafts, two driven shafts, and sliding gearing connecting the parallel shaft to the driven shafts for separate or simultaneous operation of said driven shafts.

5. In gearing, in combination, a driving shaft, a shaft parallel thereto, sliding change speed gears connecting said shafts, two driven shafts, gearing connecting the parallel shaft to one of said driven shafts, and a gear adapted to mesh with one of said gears of the parallel shaft for connecting the latter with the other driven shaft.

6. In gearing, in combination, a driving shaft, a shaft parallel thereto, sliding change speed gears connecting said shafts, two driven shafts, gearing connecting the parallel shaft to one of said driven shafts, and a gear adapted to mesh with one of the gears of the parallel shaft for connecting the latter with the other driven shaft, the gearing to said driven shafts being arranged for either separate or simultaneous operation.

7. In gearing, in combination, a driving shaft, a lay shaft, a plurality of gears on each of said shafts some of which slide into and out of mesh with the others for changes in transmission of power, two driven shafts out of line with the lay shaft and adapted to be either separately or simultaneously driven therefrom.

8. In gearing, in combination, a driving shaft, a lay shaft, a plurality of gears on each of said shafts some of which slide into and out of mesh with the others for changes in transmission of power, two parallel driven shafts one of which is alined with the driving shaft, and gearing adapted to connect either or both of the driven shafts to be driven from the lay shaft.

9. In gearing, in combination, a driving shaft, a lay shaft, a plurality of gears on each of said shafts some of which slide into and out of mesh with the others for changes in transmission of power, two parallel driven shafts one of which is alined with the driving shaft, gears connecting the lay shaft to one of said driven shafts, and a gear on the other driven shaft adapted to mesh with one of the gears of the lay shaft.

10. In gearing, in combination, a driving shaft, a lay shaft, a plurality of gears on each of said shafts some of which slide into and out of mesh with the others for changes in transmission of power, two parallel driven shafts one of which is alined with the driving shaft, gearing adapted to connect the lay shaft to the driven shafts for either separate or simultaneous drive, and means for directly connecting the driving shaft to the alined driven shaft.

11. In gearing, in combination, a driving shaft, a lay shaft, a driven shaft alined with the driving shaft, change speed gears on said driving and lay shafts adapted to give two different gear ratios, a movable direct driving connection between the alined shafts, and a sliding gear connection between the lay shaft and the driven shaft.

12. In gearing, in combination, a driving shaft, a lay shaft, a driven shaft alined with the driving shaft, gears on said driving and lay shafts, another gear, said gears being so arranged and proportioned as to give two different gear ratios and a reverse drive from the driving shaft to the lay shaft, a movable direct drive connection between the alined shafts, and a sliding gear connection from the lay shaft to the driven shaft.

13. In gearing, in combination, a driving shaft, a lay shaft, a driven shaft alined with the driving shaft, gears connecting the driving and lay shafts for two different gear ratios and a reverse drive, connections for directly driving the driven shaft from the driving shaft, and a releasable connection from the lay shaft to the driven shaft.

14. In gearing, in combination, a driving shaft, a lay shaft, a driven shaft alined with the driving shaft, gears connecting the driving and lay shafts for two different gear ratios and a reverse drive, connections for directly driving the driven shaft from the driving shaft, and a sliding gear connection from the lay shaft to the driven shaft.

15. In gearing, in combination, a driving shaft, a lay shaft, a driven shaft alined with the driving shaft, and a second driven shaft, change speed and reverse gearing between the driving and lay shafts, a releasable direct drive connection between the alined shafts, a sliding gear connection between the lay and one of the driven shafts, and a sliding gear connection between the lay and other driven shaft.

16. In gearing, in combination, a driving shaft, a lay shaft, a driven shaft alined with the driving shaft, and a second driven shaft, change speed and reverse gearing between the driving and lay shafts, a releasable direct drive connection between the alined shafts, a sliding gear connection between the lay shaft and the driven shaft alined with the driving shaft, and a sliding gear adapted to connect the other or second driven shaft with one of the gears of the lay shaft.

17. In gearing, in combination, a driving shaft, a lay shaft, and two driven shafts, non-sliding gears on some of said shafts, sliding gears on others of said shafts, said gears being so arranged and proportioned as to give several different speeds to each of said driven shafts, either separately or simultaneously, and means for sliding said gears.

18. In gearing, in combination, a driving shaft, a lay shaft, and two driven shafts, non-sliding gears on some of said shafts, sliding gears on others of said shafts, said gears being so arranged and proportioned as to drive either or both of the driven shafts at a plurality of different speeds, and means for sliding said gears.

19. In gearing, in combination, a driving shaft, a lay shaft, and two driven shafts, non-sliding gears on some of said shafts, sliding gears on others of said shafts, a movable reversing gear, said gears being so arranged and proportioned as to drive either or both of the driven shafts from the driving shaft at a plurality of different speed ratios, and means for operating said sliding and reverse gears.

20. In gearing, in combination, a driving shaft, two driven shafts adapted to be separately or simultaneously operated, and gearing connecting said several shafts and adapted to drive either or both of the driven shafts from the driving shaft at a plurality of forward and at a reverse speed.

21. In gearing, in combination, a driving shaft, two driven shafts adapted to be separately or simultaneously operated, and gearing connecting said several shafts and adapted to drive either or both of the driven shafts from the driving shaft at a plurality of forward and at a reverse speed, said gearing including three sliding gear elements, and independent operating means for each said element.

22. In gearing, in combination, a driving shaft, two driven shafts adapted to be separately or simultaneously operated, and gearing connecting said several shafts and adapted to drive either or both of the driven shafts from the driving shaft at a plurality of forward and at a reverse speed, said gearing including three sliding gear elements, and means for independently operating said sliding gears, said means permitting any or all of said sliding gears to be meshed at the same time.

23. In gearing, the combination with a casing having a driving shaft, a parallel shaft and a driven shaft, said shafts being mounted in said casing, sliding change speed gears connecting said shafts, a housing detachably secured to said casing, and a driven shaft mounted in said housing, said driven shafts being adapted to be separately or simultaneously driven from said driving shaft.

24. In gearing, the combination with a casing having a driving shaft, a parallel shaft and an alined driven shaft, said shafts being mounted in said casing, gears on each of said shafts, some of which slide into and out of mesh with the others for changes in transmission of power, a housing detachably secured to said casing, and a driven shaft mounted in said housing, said driven shafts being adapted to be separately or simultaneously driven from said driving shaft.

In testimony whereof I affix my signature in the presence of two witnesses.

HAROLD D. CHURCH.

Witnesses:
LeRoi J. Williams,
Clois J. Cote.